No. 819,838. PATENTED MAY 8, 1906.
P. ARMSTRONG.
ANIMAL TRAP.
APPLICATION FILED JUNE 17, 1905.
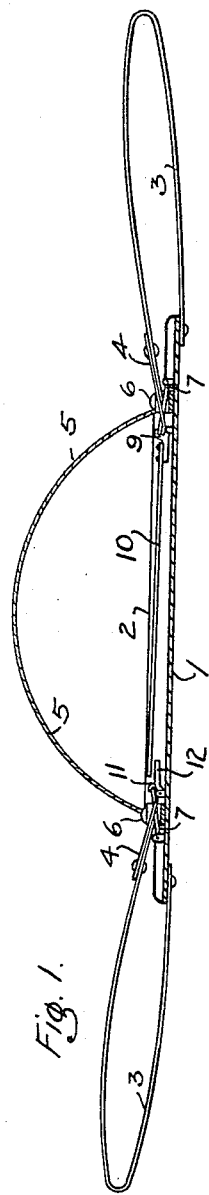
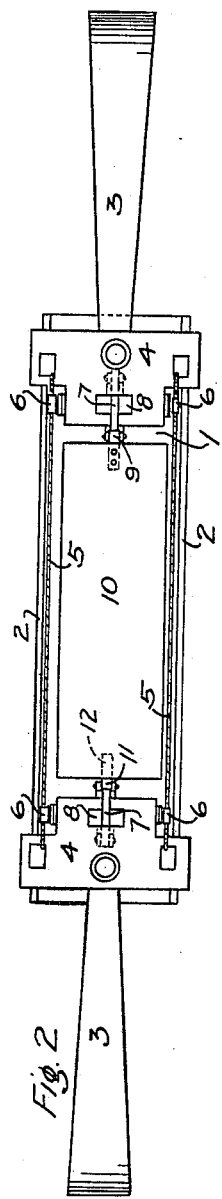
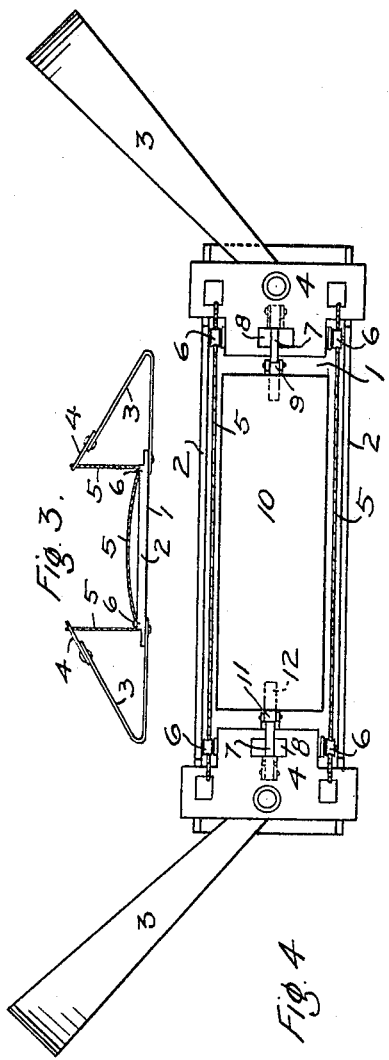
Witnesses
George H. Berry
M. A. Van House
Inventor
Preston Armstrong
By R. J. Elliott
Attorney

UNITED STATES PATENT OFFICE.

PRESTON ARMSTRONG, OF SHELTON, WASHINGTON, ASSIGNOR OF ONE-HALF TO LEMUEL R. BYRNE, OF SHELTON, WASHINGTON.

ANIMAL-TRAP.

No. 819,838.  Specification of Letters Patent.  Patented May 8, 1906.

Application filed June 17, 1905. Serial No. 265,682.

*To all whom it may concern:*

Be it known that I, PRESTON ARMSTRONG, a citizen of the United States of America, residing at Shelton, in the county of Mason and State of Washington, have invented certain new and useful Improvements in Animal-Traps, of which the following is a specification, reference being had therein to the accompanying drawings.

This invention relates to animal-traps, and more particularly to that class in which the animal is caught in a noose, and has for its objects to hold the animal so that it is impossible for it to move and yet so that its fur will not be in any way injured.

A further object is to so improve the construction of the trap that it is adjustable in shape, thus allowing it to be placed in positions which an ordinary trap could not occupy.

I attain these objects by the mechanism illustrated in the accompanying drawings, in which—

Figure 1 is a sectional side view of a trap set. Fig. 2 is a plan thereof. Fig. 3 is a small view showing the trap sprung, and Fig. 4 is a plan showing the springs turned to illustrate the adjustment thereof when it is desired to place the trap in a narrow passage.

Similar numerals of reference refer to similar parts throughout the several views.

The plate 1 has its two long sides turned upward to form the flanges 2. To each end of this plate 1 is pivotally secured the end of a flat spring 3. This spring 3 extends outward from the end of the plate 1 and then is bent back on itself, so that its other end comes practically over the end secured to the plate. To this upper end is pivotally secured a head-plate 4. This plate 4 is about as wide as the base-plate 1 and has secured to its opposite ends the ends of the double flexible loops 5. These loops 5 extend from one head-plate to the other on each side of the trap, passing first under the rollers or pulleys 6, which are fastened to the plate 1. The length of the loops 5 is such that when the springs are bent down, so that the head-plates reach the plate 1, the loop 5 will be raised from the trap a sufficient distance to allow the entrance of the animal thereunder and so that when the trap has been sprung and the springs returned to their normal position the loops 5 will be taut and will hold the animal down on the plate 1.

The head-plates 4 are held down when the trap is set by holding-bar 7, which is pivoted to the plate 1 and which passes through a hole 8 in the head-plate 4. At one end of the trap the bar 7 engages under the hook-piece 9, to which the pan 10 is secured. At the other end of the trap the bar 7 engages under the hook-piece 11, which has a lever 12 extending under the pan 10.

It will readily be seen that as soon as the animal treads on the pan 10 the hook-piece 9 releases one of the springs 3 and that as the pan 10 falls it releases, through the hook-piece 11, the other spring 3. This action of the two springs 3 is practically simultaneous. My trap is so designed that the loop 5 engages a large surface of the animal, and thus reduces the damage to the skin to the minimum, and, further, it forces it down against the flanges 2 and instantaneously kills it.

The springs 3 being pivoted to the plate 1 and the head-pieces 4 being pivoted to the springs 3, it is evident that I can move the springs 3 about the pivot without twisting the plate 4 relative to the base-plate 1, thus keeping the loops 5 symmetrical.

Having now described my invention, what I claim is—

1. In an animal-trap, the combination of a bed-plate having an upturned edge, a pair of springs oppositely secured to said bed-plate, and a flexible loop secured to and extending between the free ends of said springs and engaging said bed-plate at points intermediate said springs and adjacent to the upturned edge of the bed-plate whereby when said loop is pulled taut it acts in conjunction with said edge to kill the animal therebetween.

2. In an animal-trap, the combination of a bed-plate, a spring pivotally secured thereto, a head-plate pivotally secured to said spring, and a loop engaging said head-plate and adapted to be pulled thereby.

3. In an animal-trap, the combination of a bed-plate, a pair of springs pivotally secured to the ends of said bed-plate, head-plates secured to the ends of said springs, and a loop extending between said head-plates and adapted to be pulled thereby.

4. In an animal-trap, the combination of a bed-plate, opposite springs secured to the ends thereof, a flexible loop joining said springs and adapted to be pulled thereby, a pan pivoted to said plate and holding down one of said springs, and independent means for holding down the other spring and adapted to be removed by said pan after said first spring has been released.

In testimony whereof I affix my signature in presence of two witnesses.

PRESTON ARMSTRONG.

Witnesses:
L. R. BYRNE,
ANNA C. BYRNE.